United States Patent
Tram et al.

(10) Patent No.: US 11,554,786 B2
(45) Date of Patent: Jan. 17, 2023

(54) METHOD AND SYSTEM FOR CONTROLLING AN AUTOMATED DRIVING SYSTEM OF A VEHICLE

(71) Applicant: Zenuity AB, Gothenburg (SE)

(72) Inventors: Tommy Tram, Gothenburg (SE);
Anton Jansson, Gothenburg (SE);
Robin Grönberg, Gothenburg (SE)

(73) Assignee: Zenuity AB, Gothenburg (SE)

(*) Notice: Subject to any disclaimer, the term of this patent is extended or adjusted under 35 U.S.C. 154(b) by 132 days.

(21) Appl. No.: 16/782,397

(22) Filed: Feb. 5, 2020

(65) Prior Publication Data

US 2020/0247429 A1 Aug. 6, 2020

(30) Foreign Application Priority Data

Feb. 6, 2019 (EP) .................................... 19155773

(51) Int. Cl.
*B60W 50/14* (2020.01)
*B60W 50/08* (2020.01)
(Continued)

(52) U.S. Cl.
CPC ......... *B60W 50/085* (2013.01); *G06K 9/6263* (2013.01); *B60W 2050/0014* (2013.01);
(Continued)

(58) Field of Classification Search
CPC ......... B60W 50/085; B60W 2554/402; B60W 2554/404; B60W 2540/225;
(Continued)

(56) References Cited

U.S. PATENT DOCUMENTS 10,286,915 B2 * 5/2019 Xiao ...................... B60W 30/14
10,591,914 B2 * 3/2020 Palanisamy ............ G06N 5/045
(Continued)

FOREIGN PATENT DOCUMENTS

EP 3090913 A1 11/2016
WO 2016109540 A1 7/2016
WO 2018139993 A1 8/2018

OTHER PUBLICATIONS

Extended European Search Report dated Aug. 13, 2019 for European Patent Application No. 19155773.5, 7 pages.
Office Action dated Oct. 4, 2022 for European Patent Application No. 19155773.5, 4 pages.

*Primary Examiner* — Peter D Nolan
*Assistant Examiner* — Wae L Louie
(74) *Attorney, Agent, or Firm* — Sage Patent Group

(57) ABSTRACT

A method for setting a tuning parameter for an Automated Driving System (ADS) of a vehicle is disclosed. A corresponding non-transitory computer-readable storage medium, vehicle control device and a vehicle comprising such a control device are also disclosed. The method comprises receiving environmental data from a perception system of the vehicle, said environmental data comprising a plurality of environmental parameters, determining, by means of a self-learning model, an environmental scenario based on the received environmental data; setting the tuning parameter for the ADS based on the self-learning model and the determined environmental scenario, the tuning parameter defining a dynamic parameter of the ADS, receiving at least one signal representative of a vehicle user feedback on the set tuning parameter, and updating the self-learning model for the set tuning parameter for the identified environmental scenario based on the received vehicle user feedback.

13 Claims, 2 Drawing Sheets

(51) Int. Cl.
*G06K 9/62* (2022.01)
*B60W 50/00* (2006.01)

(52) U.S. Cl.
CPC ..... *B60W 2540/10* (2013.01); *B60W 2540/12* (2013.01); *B60W 2540/21* (2020.02); *B60W 2540/225* (2020.02); *B60W 2552/10* (2020.02); *B60W 2554/402* (2020.02); *B60W 2554/404* (2020.02); *B60W 2555/20* (2020.02)

(58) Field of Classification Search
CPC ......... B60W 2540/21; B60W 2540/10; B60W 2540/12; B60W 2555/20; B60W 2552/10; G06K 9/6263
See application file for complete search history.

(56) References Cited

U.S. PATENT DOCUMENTS

| | | | |
|---|---|---|---|
| 2015/0266455 A1* | 9/2015 | Wilson | G08G 1/0133 |
| | | | 701/93 |
| 2018/0009445 A1* | 1/2018 | Nishi | G06N 7/005 |
| 2018/0143639 A1* | 5/2018 | Singhal | G06Q 30/0269 |
| 2018/0229723 A1* | 8/2018 | Jiang | B60W 10/20 |
| 2018/0372504 A1* | 12/2018 | Singhal | G08G 1/0141 |
| 2019/0361439 A1* | 11/2019 | Zeng | G06V 10/82 |
| 2019/0361454 A1* | 11/2019 | Zeng | G05D 1/0214 |
| 2019/0361456 A1* | 11/2019 | Zeng | B60W 50/14 |
| 2020/0033868 A1* | 1/2020 | Palanisamy | G05D 1/0221 |
| 2020/0033869 A1* | 1/2020 | Palanisamy | B60W 60/001 |
| 2020/0247429 A1* | 8/2020 | Tram | B60W 50/085 |
| 2020/0284883 A1* | 9/2020 | Ferreira | G01S 7/4817 |

\* cited by examiner

METHOD AND SYSTEM FOR CONTROLLING AN AUTOMATED DRIVING SYSTEM OF A VEHICLE

CROSS-REFERENCE TO RELATED APPLICATIONS

The present application for patent claims priority to European Patent Office Application Ser. No. 19155773.5, entitled "METHOD AND SYSTEM FOR CONTROLLING AN AUTOMATED DRIVING SYSTEM OF A VEHICLE" filed on Feb. 6, 2019, assigned to the assignee hereof, and expressly incorporated herein by reference.

TECHNICAL FIELD OF THE INVENTION

The present invention relates to a method and a vehicle control device for setting a tuning parameter for an Automated Driving System, ADS, of a vehicle.

BACKGROUND

Today, many vehicles have a variety of driver support functions in the form of advanced driver assistance systems (ADAS). Also, many of these support function form a basis for current and future autonomous drive (AD) functions. Examples of ADAS features or functions include lane departure warning systems, lane centring, lane keeping aid, pilot assist, lane change assistance, parking sensors, pedestrian protection systems, blind spot monitors, adaptive cruise control (ACC), anti-lock braking systems, and so forth. These functions supplement the traditional driver control of the vehicle with one or more warnings or automated actions in response to certain scenarios.

The development of these features and functions are important factors not only in terms of increasing road safety, but also in terms of reducing the cognitive burden for vehicle users and improving the overall user experience.

Therefore, there is a need in the art for new and improved methods and system for controlling for example an adaptive cruise control (ACC) system of a vehicle.

SUMMARY OF THE INVENTION

It is therefore an object of the present invention to provide a method for setting/controlling a tuning parameter for an Automated Driving System, ADS, of a vehicle, a non-transitory computer-readable storage medium, a vehicle control device, and a vehicle comprising such a vehicle control device, which alleviate all or at least some of the drawbacks of presently known systems.

This object is achieve by means of a method, a non-transitory computer-readable storage medium, a vehicle control device and a vehicle as defined in the appended claims. The term exemplary is in the present context to be understood as serving as an instance, example or illustration.

According to a first aspect of the present invention, there is provided a method for setting a tuning parameter for an Automated Driving System (ADS) of a vehicle. The method comprises receiving environmental data from a perception system of the vehicle, where the environmental data comprising a plurality of environmental parameters. Further, the method comprises determining, by means of a self-learning model, an environmental scenario based on the received environmental data, and setting the tuning parameter for the ADS based on the self-learning model and the determined environmental scenario. The tuning parameter defines a dynamic parameter of the ADS. The method further comprises receiving at least one signal representative of a vehicle user feedback on the set tuning parameter, and updating the self-learning model for the set tuning parameter for the identified environmental scenario based on the received vehicle user feedback.

Hereby presenting a method capable of providing a personalized tuning parameter for an ADS of a vehicle (such as e.g. an Adaptive Cruise Control, ACC, system) and thereby increasing the overall driving experience and comfort for the driver of the vehicle. Moreover, the presented method an increased autonomy of the ADS function, which may lead to less physical buttons and less interactions from the driver, further improving comfort for the driver.

The present invention is at least partly based on the realization that in order to move closer to a fully autonomous driving solution, driver/user satisfaction with respect to several Automated Driving Systems, such as e.g. ACC, are of crucial importance. In particular, it is important to provide an ADS where the tuning parameter is set such that the driver/user is comfortable during the ride regardless of the situation. Thus, the present inventors realized that by utilizing a self-learning model (e.g. a machine learning algorithm) which utilizes user feedback as a key input parameter in such systems it is possible to provide a fully customized solution.

In accordance with an exemplary embodiment of the present invention, the step of determining the environmental scenario comprises determining a relationship between a plurality of signals representative of the plurality of environmental parameters, and wherein the step of setting the tuning parameter comprises setting the tuning parameter based on the determined relationship between the plurality of signals representative of the plurality of environmental parameters. Hereby providing an example realization of how the self-learning model is to be updated based on user feedback data.

Further, in accordance with another exemplary embodiment of the present invention, the method comprises interpreting no user feedback as a positive feedback and updating the self-learning model accordingly. Stated differently, if no user feedback is received, the self-learning model is rewarded. When no user feedback is received it is accordingly assumed that the driver/user of the vehicle is satisfied with the set tuning parameter. This is based on the realization that users in general are prone to complain rather than generate positive feedback to a system wherefore it is reasonable to assume that a lack of feedback is in fact a sign of satisfaction.

Further, in accordance with a second aspect of the present invention there is provided a non-transitory computer-readable storage medium storing one or more programs configured to be executed by one or more processors of a vehicle control system, the one or more programs comprising instructions for performing the method according to any one of the embodiments of the first aspect of the invention. With this aspect of the invention, similar advantages and preferred features are present as in the previously discussed first aspect of the invention.

Further, in accordance with a third aspect of the present invention, there is provided a vehicle control device for setting a tuning parameter for an automated driving system (ADS) of a vehicle. The vehicle control device comprises at least one processor, at least one memory, at least one sensor interface, and at least one communication interface. The processor is configured to execute instruction stored in the memory to perform a method for setting a tuning parameter for an ADS of a vehicle. The method comprises receiving environmental data comprising a plurality of environmental parameters, determining, by means of a self-learning model, an environmental scenario based on the received environmental data, setting the tuning parameter for the ADS based on the self-learning model and the determined environmental scenario, the tuning parameter defining a dynamic parameter of the ADS, and receiving at least one signal representative of a user feedback on the set tuning parameter, and updating the self-learning model for the set tuning parameter for the identified environmental scenario based on the received user feedback. With this aspect of the invention, similar advantages and preferred features are present as in the previously discussed first aspect of the invention.

Further embodiments of the invention are defined in the dependent claims. It should be emphasized that the term "comprises/comprising" when used in this specification is taken to specify the presence of stated features, integers, steps, or components. It does not preclude the presence or addition of one or more other features, integers, steps, components, or groups thereof.

These and other features and advantages of the present invention will in the following be further clarified with reference to the embodiments described hereinafter.

BRIEF DESCRIPTION OF FIGURES

Further objects, features and advantages of embodiments of the invention will appear from the following detailed description, reference being made to the accompanying drawings, in which.

DETAILED DESCRIPTION

Figure 1:
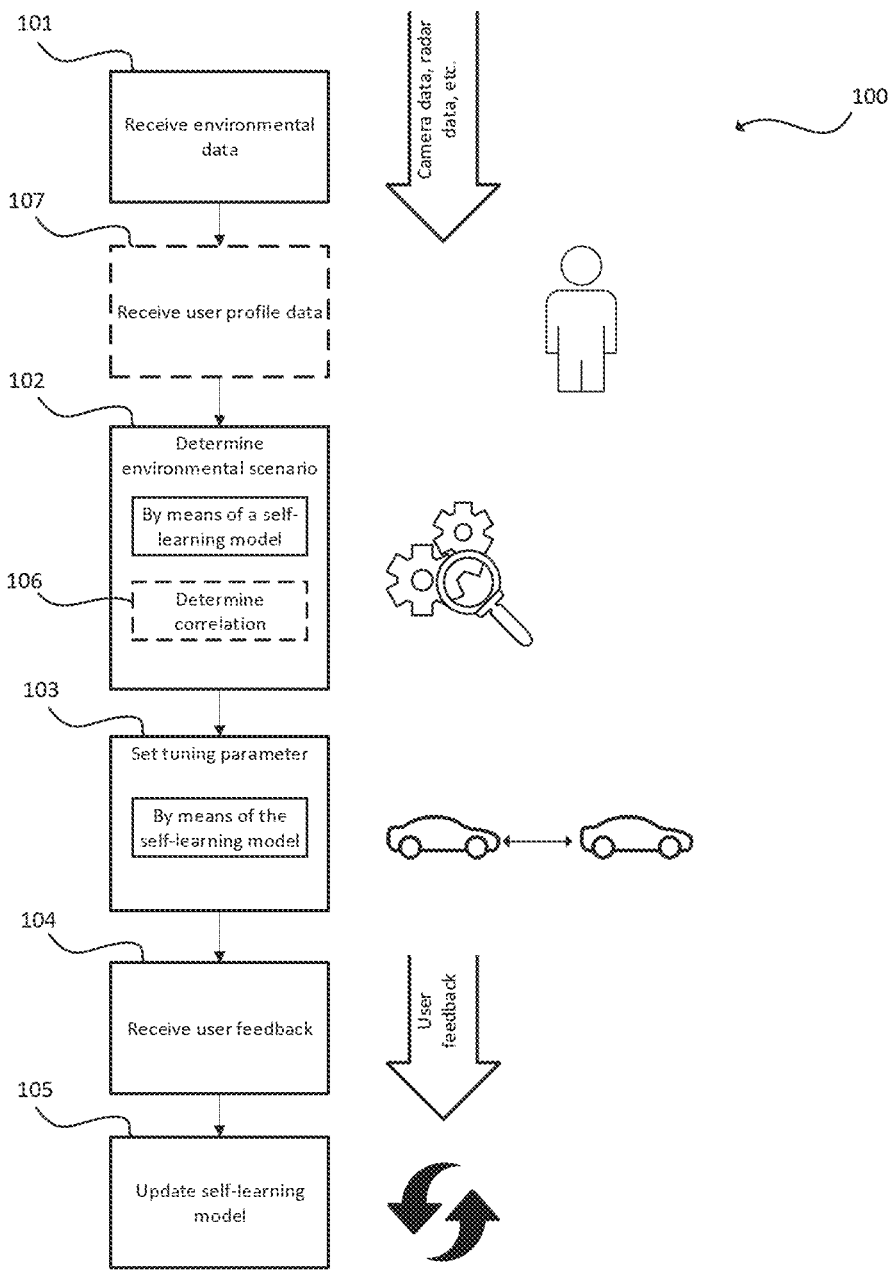
FIG. 1 is a flow chart representation of a method for setting a tuning parameter for an Automated Driving System (ADS) of a vehicle, according to an embodiment of the present invention.

Those skilled in the art will appreciate that the steps, services and functions explained herein may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories store one or more programs that perform the steps, services and functions disclosed herein when executed by the one or more processors.

In the following description of exemplary embodiments, the same reference numerals denote the same or similar components.

Even though the following discussion is mainly focused on an Automated Driving System (ADS) in the form of an Adaptive Cruise Control (ACC) system and the selection of the associated gap parameter (may also be referred to as a time gap, following distance, gap distance, and similar), it is clear for the skilled reader that the present invention is analogously applicable for other ADS, such as e.g. lateral position within a lane, automatic overtaking timing, slot size for lane changes, etc.

FIG. 1 shows a schematic flow chart representation of a method 100 for setting a tuning parameter for an Automated Driving System (ADS) of a vehicle according to an exemplary embodiment of the present invention. The vehicle may be any type of suitable road vehicle such as e.g. a car, a truck, or a bus. The method 100 comprises receiving environmental data 101 from a perception data from a perception system of the vehicle. The vehicle perception system may for example comprise one or more of a radar arrangement, LIDAR arrangement, and one or more cameras, or any other suitable automotive grade sensor. The environmental data comprises a plurality of environmental parameters associated with a surrounding area of the vehicle. For example, the environmental data may comprise one or more of a number of surrounding objects (traffic intensity), velocity of surrounding objects (e.g. other vehicles), velocity of the vehicle, distance to each surrounding object, distance between each surrounding object, a number of lanes, road type, a type of object in front of the vehicle (e.g. car, truck, bus, etc.), time of day (light or dark), weather data, day of the week, ego-vehicle size, infrastructure data (e.g. road work), distance to destination, and a geographical location of the vehicle.

Next, an environmental scenario is determined 102 by means of a self-learning model based on the received 101 environmental data. The self-learning model, may also be referred to as an Artificial Intelligence (AI) module, can for example be a machine learning algorithm, such as e.g. a reinforcement learning algorithm. In more detail, suitable reinforcement learning methods include Q-learning (value based learning), actor critic, temporal difference (TD) learning, value iteration, policy gradient, policy search or Monte Carlo (MC) tree search. Furthermore, determining an environmental scenario is to be understood as determining a current situation of the vehicle, such as e.g. traveling on a highway during rush-hour traffic, causal driving on a rural road, driving in high risk conditions (snow storm, heavy rain, etc.), driving in dense urban traffic, and so on. Moreover, the environmental data may further include a mental state of the driver (e.g. stressed, calm, anxious, etc.).

Further, the method 100 comprises setting 103 the tuning parameter for the ADS based on the self-learning model and the determined environmental scenario. The tuning parameter defines a dynamic parameter of the ADS, such as for example a time gap for an ACC. Then, one or more signals are received 104, where the signals are indicative of a user feedback on the set tuning parameter. In accordance with one exemplary embodiment the user feedback is quantified as a vehicle user satisfaction value in the form of one or more detectable and quantifiable signals, such as e.g. acceleration pedal actuation, brake pedal actuation, voice commands, tactile feedback, and eye-tracking data, driver in the loop steering, etc. Based on these input signals, one can (based on one or more predefined criteria) determine if the vehicle user is satisfied or unsatisfied with the selected tuning parameter in the current environmental scenario, and update 105 the self-learning model accordingly. Thus, in other words, the method further 100 comprises updating 105 the self-learning model for the set tuning parameter for the identified environmental scenario based on the received user feedback.

In particular, the user feedback may be based on button presses (tactile feedback), grip strength on steering wheel, grip position on steering wheel, honking, voice commands, facial recognition data, eye tracking data (e.g. gaze direction, pupil size, etc.), infotainment data (e.g. control of music system).

In an exemplary embodiment of the present invention, the step of determining 102 the environmental scenario comprises determining 106 a relationship (e.g. a correlation) between a plurality of signals representative of the plurality of environmental parameters. The step of setting the tuning parameter may then accordingly comprise setting the tuning parameter based on the determined relationship between the plurality of signals representative of the plurality of environmental parameters.

In more detail, the presented method 100 allows for a driver/user to tell the vehicle which tuning parameter (e.g. time gap/following distance) that he/she thinks is most appropriate. The function then updates the self-learning model to be able to react properly to similar traffic situations (environmental scenarios) in the future. This may as mentioned be done with reinforcement learning, which learns a policy (what decision to make given the input). This policy can be in form of a Neural Network, this means that the input data is not stored, it is only the weights of the network that is stored, and later used to map the input data to the new tuning parameter choice. In other words, it is a model of a driver's/user's preferences that are stored, and not the actual input signals.

Further, the method 100 may include a step of receiving 107 user profile data from a control system of the vehicle, the user profile data comprising a user profile and wherein the step of determining an environmental scenario is further based on the user profile. This allows the method 100 to be customizable to individual drivers/users of the vehicle rather than having a general tuning parameter output for the vehicle. The user profile may either be provided by means of a face recognition (camera and appropriate software), user input to a vehicle infotainment system, Bluetooth connection to user equipment (e.g. smartphone), and similar. Alternatively, this may be understood as that the self-learning model is user specific, such that a specific self-learning model is initialized each driving session based on who is driving/using the vehicle (i.e. based on the received user profile data).

Further, according to an exemplary embodiment of the invention, user feedback is only received while the ADS is in an active state. In other words, the self-learning model is only updated based on user feedback received while the relevant ADS is in use. This further ensures that relevant data is used to train the self-learning model which can provide a higher quality customization.

In accordance with an exemplary embodiment of the present invention, the method comprises receiving a base tuning parameter for the ADS based on a base model. The base model may be construed as a "common" or "global" model that comprises a plurality of predefined base tuning parameters for a plurality of predefined environmental scenarios. Thus, the step of setting the tuning parameter by means of the self-learning model is further based on the base tuning parameter. This is particularly advantageous for newly purchased vehicles in which the self-learning model has not yet received a sufficient amount of data to be fully personalized to one or more users/drivers of the vehicle. The base model will then generate some general tuning parameters based on some predefined environmental scenarios. The base model can be understood as a "static" model, in contrast to the "dynamic" self-learning model which is periodically trained over time. Naturally, the base model may be updated based on input data from a plurality of associated vehicles in order to provide more comfortable tuning parameters which will work for a majority of vehicle drivers/users.

In other words, the base model makes a generalized guess, i.e. how "most people" would like the vehicle's ADS to behave. The base model may comprise a base algorithm in the form of a supervised neural network that is trained once and does not change once it is deployed into the vehicle. Alternatively, the base model may be stored in remote data repository and deployed as a cloud based solution. The self-learning model on the other hand utilizes user feedback from a vehicle driver/user (such as e.g. active changes of the settings by means of button presses, voice commands, or acceleration or brake pedal presses) while the vehicle is operational and the associated ADS is active. The feedback is then accordingly used by the self-learning model to improve and personalize the function online, i.e. while driving. For example, in the case of the ADS being an ACC the feedback may be a button press that gives information that the driver/user wants to be closer to the preceding vehicle.

During manual driving, the driver keeps a following distance to a preceding vehicle that is different for different situations. For example, one generally keeps a closer distance during urban driving at low speeds as compared to when one is driving on a highway at high speed. Similarly, a greater following distance is used when driving in icy conditions as compared to sunny conditions. In conventional ACC systems this type of dynamic behaviour is not accounted for, but instead the driver has to adjust the following distance.

As mentioned in the foregoing, the self-learning model may comprise a reinforcement learning algorithm. Thus, the step of updating 105 the self-learning model may comprise penalizing or rewarding the reinforcement learning algorithm based on the received vehicle user feedback. In particular, any vehicle user feedback that is indicative of satisfaction with the set tuning parameter will result in rewarding of the reinforcement learning algorithm. Analogously, any user feedback that is indicative of dissatisfaction of the set tuning parameter will result in penalizing of the reinforcement learning algorithm.

Moreover, according to an exemplary embodiment, the step of updating 105 the self-learning model comprises rewarding the reinforcement learning algorithm if no vehicle user feedback is received. In more detail, the inventors realized that in most scenarios, a lack of user feedback is a strong indication of satisfaction. This is even more likely in the present case with vehicle tuning parameters since a poorly set tuning parameter (e.g. too short following distance) will almost certainly result in a brake request by the driver/user of the vehicle which is interpreted as dissatisfaction with the set tuning parameter. However, if the driver/user does not provide any feedback in the form of an active adjustment (driver in the loop steering), it is highly likely that the driver/user is satisfied with the set parameter and the self-learning model is updated accordingly.

In an illustrative example where the ADS is an ACC, the self-learning model (e.g. reinforcement learning algorithm) may be trained with for example the following input (environmental) parameters: number of surrounding objects, speed of surrounding objects, speed of host vehicle (ego-vehicle), distance between surrounding objects, number of lanes, road type, type of object in front (e.g. truck, bus, car, etc.). During training (i.e. while the ACC is active), the self-learning model further takes in the choice of a vehicle driver/user, the self-learning model then tries to find a correlation between the inputs and the chosen gap parameter (i.e. time gap or following distance). In particular, the self-learning model is arranged to take the user-selected time gap as feedback and update the correlation, i.e. to adjust the correlation based on the new choices while the driver/user operates the vehicle.

Figure 2:
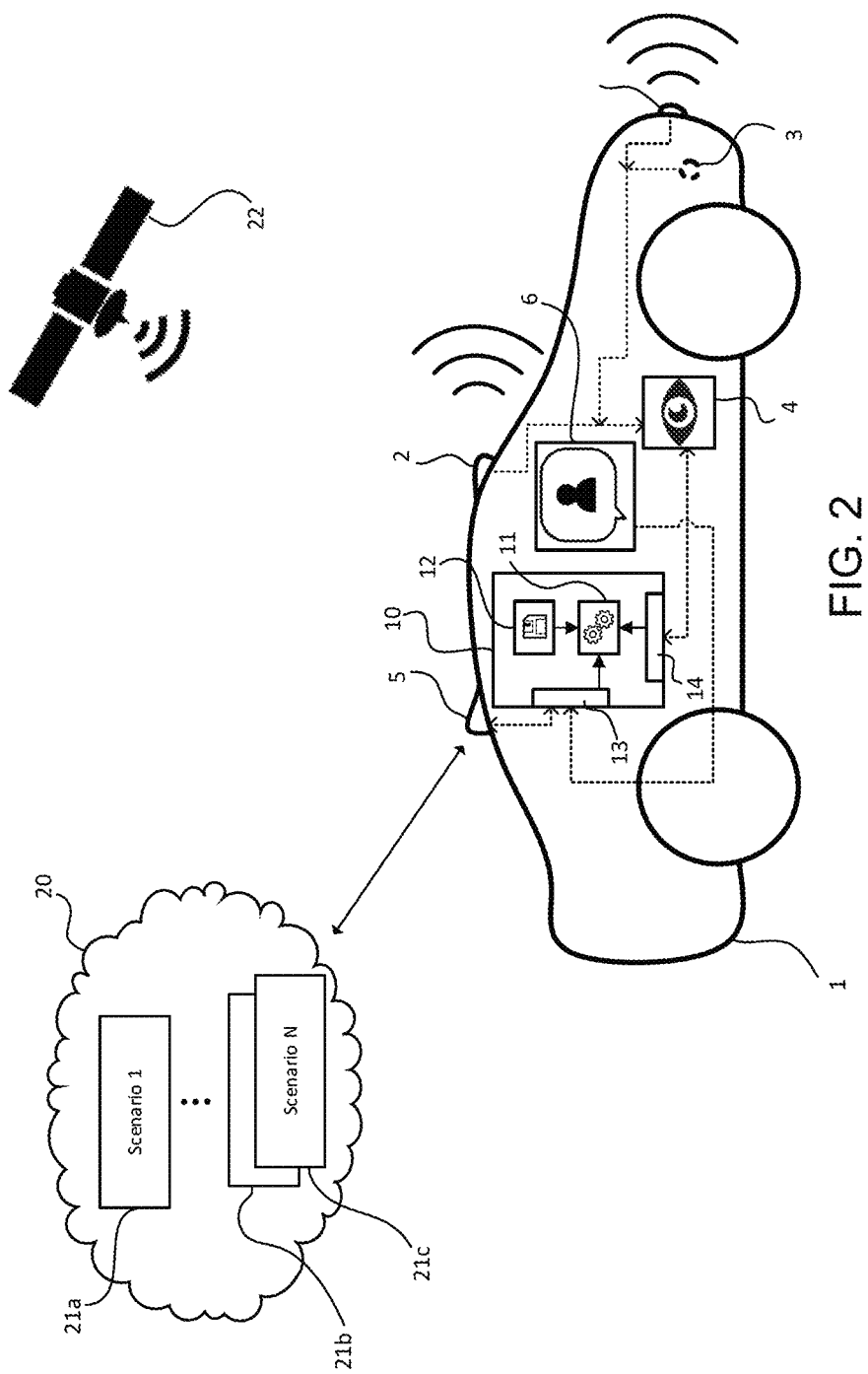
FIG. 2 is a schematic perspective view drawing of vehicle control device for setting a tuning parameter for an Automated Driving System (ADS) of a vehicle, according to an embodiment of the present invention.

FIG. 2 is a schematic perspective view illustration of a vehicle 1 comprising a vehicle control device 10 for setting a tuning parameter for an Automated Driving System (ADS) of the vehicle 1. The Automated Driving System (ADS), may for example be an Adaptive Cruise Control (ACC) system, a lateral position within a lane system, an over-take assistance system. The vehicle control device 10 comprises a processor 11, a memory 12, a sensor interface 13 and a communication interface 13. The processor 11 is configured to execute instructions stored in the memory to perform a method for setting a tuning parameter for an ADS of the vehicle 1. The method may for example comprise the steps according to any one of the embodiments of the method discussed in the foregoing. Moreover, optionally, depending on functionality provided in the control device 10 additional communication/antenna interfaces 14 may be provided and furthermore, also additional sensor interfaces 13 may be provided for acquiring further data from sensors within the vehicle 1.

It should be appreciated that a communication/antenna interface 14 may also provide the possibility to acquire sensor data directly or via dedicated sensor control circuitry in the vehicle: for instance GPS data may be acquired through the antenna interface 14, some sensors in the vehicle may communicate with the control circuit 10 using a local network setup, such as CAN bus, I2C, Ethernet, optical fibres, and so on. The communication interface 14 may be arranged to communicate with other control functions of the vehicle and may thus be seen as control interface also; however, a separate control interface (not shown) may be provided. Local communication within the vehicle may also be of a wireless type with protocols such as WiFi, LoRa, Zigbee, Bluetooth, or similar mid/short range technologies.

Moving on, the processor 11 is configured to receive environmental data comprising a plurality of environmental parameters associated with the vehicle 1. The environmental data can be retrieved via the sensor interface 14 and/or the communication interface 13 depending on the type of data that is requested. A set of environmental parameters, such as e.g. a number of surrounding objects (vehicles), velocity of surrounding objects, distance to each surrounding object, distance between each surrounding object, a number of lanes, road type, a type of object in front of the vehicle, can be acquired by a perception system 4 of the vehicle by means of various automotive grade sensors 2, 3 (radar, LIDAR, cameras, sonar, etc.). Other environmental parameters, such as e.g. a geographical position (retrieved by means of a GNSS 22), weather data, traffic information, etc.

Some environmental parameters may for example be retrieved from a remote database via a vehicle antenna 5 connect to one or more external networks. Cellular communication technologies can be used for long range communication such as to external networks. Examples of cellular radio technologies are GSM, GPRS, EDGE, LTE, 5G NR, and so on, also including future cellular solutions. However, in some solutions mid to short range communication technologies are used such as Wireless Local Area Network (WLAN), e.g. IEEE 802.11 based solutions.

The processor 11 is further configured to determine, by means of a self-learning model, an environmental scenario based on the received environmental data. In other words, the processor 11 identifies an environmental scenario based on the retrieved sensory and communication data. An environmental scenario may for example be a specific traffic situation (rush hour traffic, night time driving, driving on a slippery road, driving on rural country roads, etc.). Then, based on the determined/identified environmental scenario, the processor 11 is configured to set a tuning parameter for the ADS. Thus, the tuning parameter defines a dynamic (adjustable) parameter of the ADS.

Furthermore, the processor 11 is configured to receive at least one signal indicative or representative of a user feedback 6 and to update the self-learning model for the set tuning parameter for the identified environmental scenario based on the received user feedback 6. The user may for example be a driver of the vehicle 1 or an occupant of the vehicle 1 in the case of the autonomous driving. In more detail, the processor 11 is configured to update a correlation between the input signals representing the environmental parameters and the set tuning parameter in the self-learning model.

Furthermore, the processor 11 is further configured to receive a base tuning parameter for the ADS based on a base model 20. The base model 20 comprises a plurality of predefined base tuning parameters for a plurality of predefined environmental scenarios 21a, 21b, 21c. In an exemplary embodiment, the predefined environmental scenarios 21a-c are in the form of a set of predefined user profiles or driver profiles. The base model can be construed as a base algorithm which is pre-trained and then configured to provide a generalized tuning parameter based on e.g. an identified environmental scenario or user profile. In reference to the latter, the pre-set user profiles can be based on driver types (aggressive or passive), driving culture, country of residence, and set at the purchase of the car to provide the self-learning (local) model with a good starting value for the tuning parameter.

The present disclosure has been presented above with reference to specific embodiments. However, other embodiments than the above described are possible and within the scope of the disclosure. Different method steps than those described above, performing the method by hardware or software, may be provided within the scope of the disclosure. Thus, according to an exemplary embodiment, there is provided a non-transitory computer-readable storage medium storing one or more programs configured to be executed by one or more processors of a vehicle control system, the one or more programs comprising instructions for performing the method according to any one of the above-discussed embodiments. Alternatively, according to another exemplary embodiment a cloud computing system can be configured to perform any of the methods presented herein. The cloud computing system may comprise distributed cloud computing resources that jointly perform the methods presented herein under control of one or more computer program products.

The processor(s) (associated with the vehicle control device) may be or include any number of hardware components for conducting data or signal processing or for executing computer code stored in memory. The device has an associated memory, and the memory may be one or more devices for storing data and/or computer code for completing or facilitating the various methods described in the present description. The memory may include volatile memory or non-volatile memory. The memory may include database components, object code components, script components, or any other type of information structure for supporting the various activities of the present description. According to an exemplary embodiment, any distributed or local memory device may be utilized with the systems and methods of this description. According to an exemplary embodiment the memory is communicably connected to the processor (e.g., via a circuit or any other wired, wireless, or network connection) and includes computer code for executing one or more processes described herein.

What is claimed is:

1. A method for setting a tuning parameter for an Automated Driving System, ADS, of a vehicle, the method comprising:
    receiving environmental data from a perception system of the vehicle, said environmental data comprising a plurality of environmental parameters;
    determining, by means of a self-learning model, an environmental scenario based on the received environmental data;
    setting the tuning parameter for the ADS based on the self-learning model and the determined environmental scenario, the tuning parameter defining a dynamic parameter of the ADS; and
    receiving at least one signal representative of a vehicle user feedback on the set tuning parameter, and updating the self-learning model for the set tuning parameter for the identified environmental scenario based on the received vehicle user feedback,
        wherein the step of receiving vehicle user feedback comprises determining a vehicle user satisfaction value based on at least two of the following:
        acceleration pedal actuation, brake pedal actuation, voice commands, tactile feedback, and eye-tracking data, driver in the loop steering, and
        wherein the step of updating the self-learning model is further based on the determined vehicle user satisfaction value.

2. The method according to claim 1, wherein the step of determining the environmental scenario comprises determining a relationship between a plurality of signals representative of the plurality of environmental parameters, and
    wherein the step of setting the tuning parameter comprises setting the tuning parameter based on the determined relationship between the plurality of signals representative of the plurality of environmental parameters.

3. The method according to claim 1, further comprising:
    receiving user profile data from a control system of the vehicle, the user profile data comprising a user profile,
    wherein the step of determining an environmental scenario is further based on the user profile.

4. The method according to claim 1, comprising:
    receiving a base tuning parameter for the ADS based on a base model, said base model comprising a plurality of predefined base tuning parameters for a plurality of predefined environmental scenarios,
    wherein the step of setting the tuning parameter is further based on the base tuning parameter.

5. The method according to claim 1, wherein the environmental data comprises at least one of:
    a number of surrounding objects, velocity of surrounding objects, velocity of the vehicle, distance to each surrounding object, distance between each surrounding object, a number of lanes, road type, a type of object in front of the vehicle, time of day, weather data, and day of the week, a geographical location of the vehicle.

6. The method according to claim 1, wherein the self-learning model comprises a reinforcement learning algorithm,
    wherein the step of updating the self-learning model comprises penalizing or rewarding the reinforcement learning algorithm based on the received vehicle user feedback.

7. The method according to claim 6, wherein the step of updating the self-learning model comprises rewarding the reinforcement learning algorithm if no vehicle user feedback is received.

8. The method according to claim 1, wherein the ADS is an Adaptive Cruise Control, ACC, System, and wherein the tuning parameter is a first gap parameter.

9. A vehicle control device for setting a tuning parameter for an Automated Driving System, ADS, of a vehicle, the vehicle control device comprising:
    at least one processor;
    at least one memory;
    at least one sensor interface;
    at least one communication interface,
    wherein the processor is configured to execute instructions stored in the memory to perform a method for setting a tuning parameter for an Automated Drive System, ADS, of a vehicle, wherein the method comprises:
    receiving environmental data comprising a plurality of environmental parameters;
    determining, by means of a self-learning model, an environmental scenario based on the received environmental data;
    setting the tuning parameter for the ADS based on the self-learning model and the determined environmental scenario, the tuning parameter defining a dynamic parameter of the ADS; and
    receiving at least one signal representative of a user feedback on the set tuning parameter, and updating the self-learning model for the set tuning parameter for the identified environmental scenario based on the received user feedback,
        wherein the step of receiving vehicle user feedback comprises determining a vehicle user satisfaction value based on at least two of the following:
        acceleration pedal actuation, brake pedal actuation, voice commands, tactile feedback, and eye-tracking data, driver in the loop steering, and
        wherein the step of updating the self-learning model is further based on the determined vehicle user satisfaction value.

10. The vehicle control device according to claim 9, wherein the step of determining the environmental scenario comprises determining a relationship between a plurality of signals representative of the plurality of environmental parameters, and
    wherein the step of setting the tuning parameter comprises setting the tuning parameter based on the determined relationship between the plurality of signals representative of the plurality of environmental parameters.

11. The vehicle control device according to claim 9, wherein the self-learning model comprises a reinforcement-learning algorithm, and
    wherein the step of updating a second gap parameter comprises penalizing or rewarding the reinforcement learning algorithm based on the received vehicle user feedback.

12. The vehicle control device according to claim 11, wherein the step of updating the tuning parameter comprises rewarding the reinforcement-learning algorithm if no vehicle user feedback is received.

13. A vehicle comprising a vehicle control device, the vehicle control device comprising:
    at least one processor;
    at least one memory;
    at least one sensor interface;
    at least one communication interface, wherein the processor is configured to execute instructions stored in the memory to perform a method for setting a tuning parameter for an Automated Drive System, ADS, of a vehicle, wherein the method comprises:
receiving environmental data comprising a plurality of environmental parameters;
determining, by means of a self-learning model, an environmental scenario based on the received environmental data;
setting the tuning parameter for the ADS based on the self-learning model and the determined environmental scenario, the tuning parameter defining a dynamic parameter of the ADS; and
receiving at least one signal representative of a user feedback on the set tuning parameter, and updating the self-learning model for the set tuning parameter for the identified environmental scenario based on the received user feedback,
  wherein the step of receiving vehicle user feedback comprises determining a vehicle user satisfaction value based on at least two of the following:
  acceleration pedal actuation, brake pedal actuation, voice commands, tactile feedback, and eye-tracking data, driver in the loop steering, and
  wherein the step of updating the self-learning model is further based on the determined vehicle user satisfaction value.

* * * * *